(12) United States Patent  
Cantrill

(10) Patent No.: US 7,194,731 B1  
(45) Date of Patent: Mar. 20, 2007

(54) METHOD AND APPARATUS FOR SPECULATIVE TRACING

(75) Inventor: Bryan M. Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 549 days.

(21) Appl. No.: 10/713,406

(22) Filed: Nov. 14, 2003

(51) Int. Cl.
*G06F 9/40* (2006.01)
*G06F 17/40* (2006.01)

(52) U.S. Cl. .......................... 717/128; 717/130; 700/5

(58) Field of Classification Search ................ 717/128, 717/130
See application file for complete search history.

(56) References Cited

U.S. PATENT DOCUMENTS 6,467,083 B1 * 10/2002 Yamashita ................... 717/128
6,813,731 B2 * 11/2004 Zahavi et al. ................. 714/45
6,836,861 B2 * 12/2004 Chen et al. .................... 714/45
7,047,521 B2 *  5/2006 Bunnell ....................... 717/130

OTHER PUBLICATIONS

Techniques for Efficient Inline Tracing on a Shared-Memory Multiprocessor Susan J. Eggers, David H. Keppel, Eric J. Koldinger, and Henry M. Levy. University of Washington.*
Improving Trace Cache Effectiveness with Branch Promotion and Trace Packing. Sanjay Jeram Patel, Marius Evers, Yale N. Patt. The University of Michigan.*
Tamches, Ariel and Miller, Barton P; Fine-Grained Dynamic Instrumentation of Commodity Operating System Kernels; [Online]; http://www.usenix.org/publications/library/proceedings/osdi99/full_papers/tamches/tamches.pdf, Published Feb. 1999.
Murayama, John; "Performance Profiling Using TNF"; [Online]; http://developers.sun.com/solaris/articles/tnf.html, Jul. 2001.
Lorch, Jacob R. and Smith, Alan J.; "The Vtrace Tool: Building a system Tracer for Windows NT and Windows 2000"; [Online] http://msdn.microfost.com/msdnmag/issues/1000/Vtrace/default.aspx, Oct. 2000.
"Chapter 10. The Generalized Trace Facility (GTF)"; [Online]; http://publib.boulder.ibm.com/cgi-bin/bookmgr/BOOKS/IEA2V100/CCONTENTS, Jan. 2001.
Mirgorodskii, Alex; "The Path to Portable Kernel Instrumentation: The Keminst API"; http://www.dyninst.org/mtg2003/slides/KeminstAPI.pdf, Apr. 2003.
Richard Moore, et al.; "IBM Dynamic Probes"; http://www-124.ibm.com/developerworks/opensource/linux/projects/dprobes/README, 2000.
K. Yaghmour et al.; "Measuring and Characterizing System Behavior Using Kernel-Level Event Logging"; Proceedings of the 2000 USENIX Annual Technical Conference; Jun. 18-23, 2000, San Diego, California, USA.

* cited by examiner

*Primary Examiner*—Wei Zhen
*Assistant Examiner*—Thai V Pham
(74) *Attorney, Agent, or Firm*—Osha Liang LLP

(57) ABSTRACT

A method of a speculative tracing, including defining the speculative tracing using a plurality of probes, firing at least one of the plurality of probes defined by the speculative tracing, allocating at least one instance of a first speculative buffer arranged to transfer data to a first principal buffer, if one of the plurality of probes comprises a first speculation function, and determining a first state value associated with the first speculative buffer.

21 Claims, 4 Drawing Sheets

METHOD AND APPARATUS FOR SPECULATIVE TRACING

BACKGROUND

A tracing framework is used to understand the behavior of complex computer systems. Tracing performed using the tracing framework involves recording data from a location or occurrence in the software of the computer system. In a tracing framework that offers comprehensive coverage, the framework provides a mechanism to allow events not to be traced or the user may be flooded with unwanted data.

Tracing frameworks use predicates to limit the events traced by only tracing data if a certain condition is found to be true. Predicates are a useful mechanism when the user knows whether the probe event is interesting when a probe is triggered. For example, if the user is only interested in an activity associated with a certain process or a certain file descriptor, the user can define a predicate that obtains knowledge about only that particular process or file descriptor when the probe is triggered.

However, some situations exist when the user may not have knowledge whether a given probe event is interesting at the time that the probe is triggered. Often the user can only make the determination that the probe event is interesting after the probe is triggered.

For example, if a function with the software of a computer system is failing in an irregular manner with a common error code, the user may wish to better understand the code path that is leading to the error condition. To capture the code path, the user could enable every probe—but only if the failing function call can be isolated in such a way that meaningful predicates can be defined. If the failures are sporadic or non-deterministic, the user is forced to trace all events that may be interesting, and later use post-process analysis of the data to filter out particular data that is not associated with the failing code path. In this case, even though the number of interesting events may be reasonably small, the number of events to analyze during post-process analysis and that must be traced is very large.

SUMMARY

In general, one aspect of the invention relates to a method of a speculative tracing. The method includes defining the speculative tracing using a plurality of probes, firing at least one of the plurality of probes defined by the speculative tracing, allocating at least one instance of a first speculative buffer arranged to transfer data to a first principal buffer, if one of the plurality of probes comprises a first speculation function, and determining a first state value associated with the first speculative buffer.

In general, one aspect of the invention relates to a system for a speculative tracing using a tracing framework. The system including a first principal buffer configured to store data from the tracing framework and assocaited with a first processor, a first instance of a first speculative buffer associated with the first principal buffer and configured to transfer data to the first principal buffer, where the first speculative buffer has a first state value associated therewith, and a plurality of probes defining the speculative tracing executing on the tracing framework, where the first state value is updated upon firing at least one of the plurality of probes.

In general, one aspect of the invention relates to a computer system for a speculative tracing. The computer system includes a first processor, a memory, a storage device, and software instructions stored in the memory for enabling the computer system to define the speculative tracing using a plurality of probes, fire at least one of the plurality of probes defined by the speculative tracing, allocate at least one instance of a first speculative buffer arranged to transfer data to a first principal buffer, if one of the plurality of probes comprises a first speculation function, and determine a first state value assocaited with the first speculative buffer.

Other aspects of the invention will be apparent from the following description and the appended claims.

DETAILED DESCRIPTION

Figure 1:
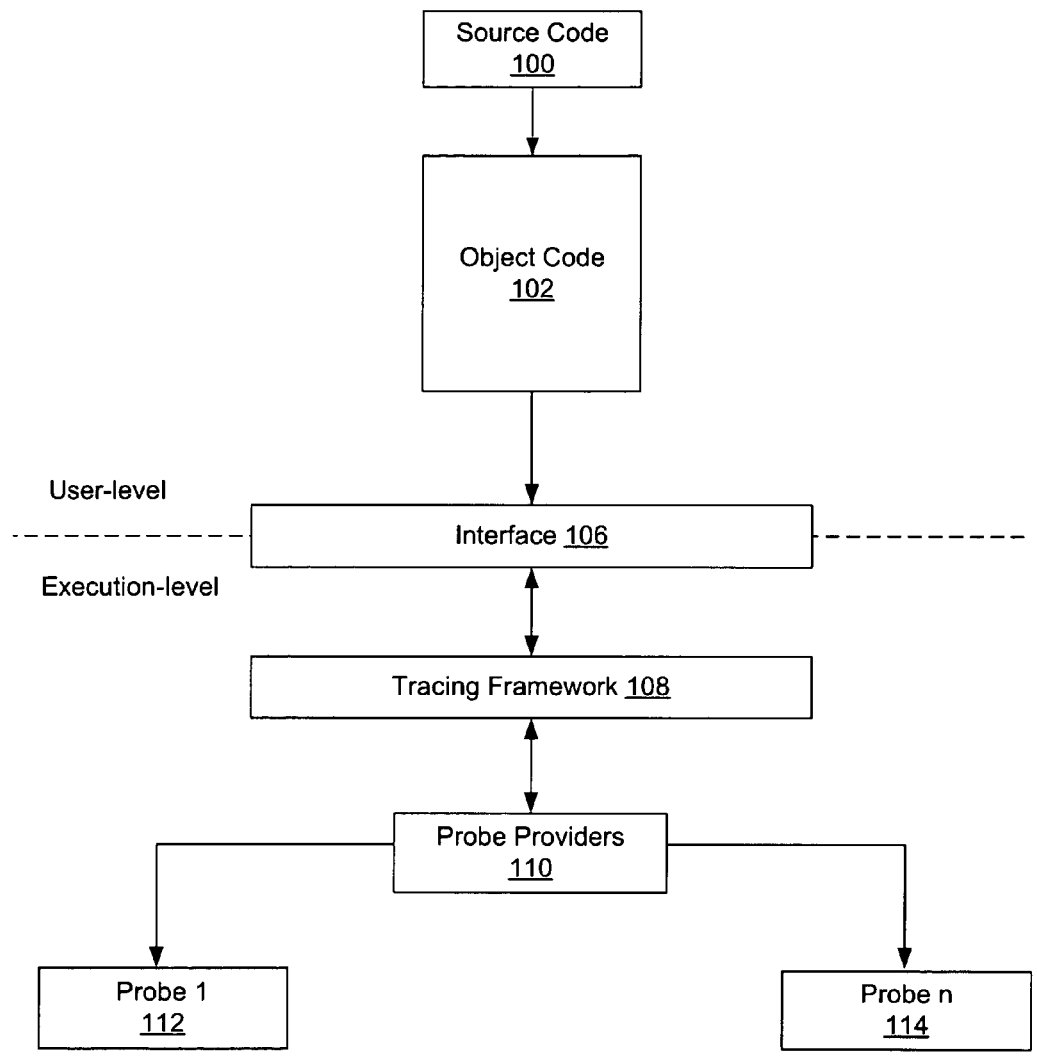
FIG. 1 shows a tracing framework in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

One or more embodiments of the invention relate to a tracing framework and a method for tracing operation. Specifically, one or more embodiments of the invention relate to a tracing framework and method for speculative tracing.

FIG. 1 shows a tracing framework in accordance with one or more embodiments of the invention. FIG. 1 shows source code (100), which defines performance-related questions with respect to a software system. Performance-related questions, for example, may relate to processing speed, resource consumption, and/or proper execution, etc.

In an embodiment of the invention, the source code (100) is obtained using a command line or a graphical user interface. Once obtained, the source code (100) is compiled into executable object code (102). Requests from the object code (102) are communicated to an execution-level tracing framework (108) via an execution interface (106). The tracing framework (108) interprets the requests from the object code (102) and forwards the requests to the probe providers (110), which activate certain probes (112 and 114) in an instrumented program (not shown). The probes (112 and 114) correspond to a particular location and/or activity within the instrumented program, and answer the specific performance-related question. Further, these probes (112 and 114) can gather the specified information and store the information accordingly.

In one or more embodiments, the probes (112 and 114) may be described in the following psuedo-code:

Code Sample 1

```
1    probe description
2    /predicate/
     {
3    action
     }
```

In line 1 of the Code Sample 1, the name of the probe is defined. Line 2 shows a predicate, which is a pre-determined, conditional statement that determines whether the action (shown at line 3) of the probe is to be executed. The predicate evaluates to a value of true or false, e.g., an integer value of zero or one, or a defined pointer type. Line 3 of Code Sample 1 defines the action of the probe that is executed, i.e., the tracing operation. Examples of tracing operations include tracing (or recording data), modifying a state variable, etc.

A tracing operation is considered to be initiated once the predicate is evaluated. A tracing operation may be terminated if a pre-determined condition, as defined by the predicate, is not satisfied. In this manner, only relevant data is traced and subsequently stored. However, if a predicate is not necessarily useful in determining whether the data is relevant or desirable, then the probes are triggered. As a result, the corresponding data is traced, stored, and evaluated.

In one or more embodiments, the invention allows relevant and/or desirable data to be stored after the probe has been fully executed, using a mechanism known as speculative tracing. Speculative tracing allows data to be "tentatively" traced and then later committed or discarded based on whether the data is desirable or not. Therefore, probes in the invention can be classified as either speculative or non-speculative in nature.

Figure 2:
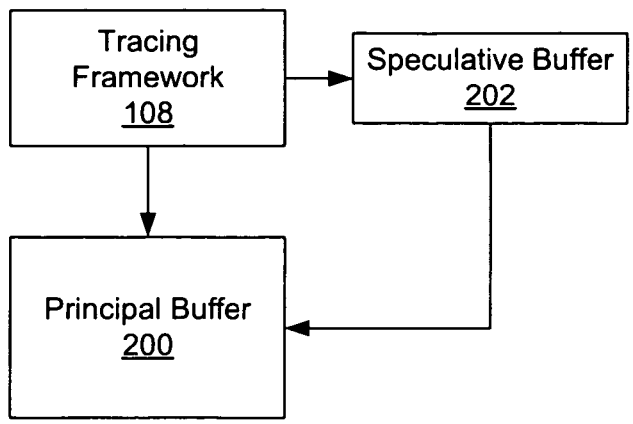
FIG. 2 shows a principal buffer and a speculative buffer of a tracing framework in accordance with one or more embodiments of the invention.

The invention uses specialized storage areas to execute speculative tracing. FIG. 2 shows a principal buffer and a speculative buffer of a tracing framework in accordance with one or more embodiments of the invention. In particular, FIG. 2 shows a principal buffer (200), which is associated with a particular processor (not shown), and a speculative buffer (202), which is associated with the principal buffer (200). Both the principal buffer (200) and the speculative buffer (202) are connected to a tracing framework (108), which has functionality to control the buffers and transfer data to and between the buffers.

In one or more embodiments of the invention, the arrangement of the buffers and the association between the buffers and processors may vary. For example, a buffer may be associated with multiple processors, or multiple buffers may be associated with a single processor. Further, in one or more embodiments, multiple speculative buffers may be stored in cells of the same array or table.

The speculative buffer (202) stores data generated during speculative tracing. Generally, the speculative buffer (202) only stores data for a temporary time period. On the other hand, the principal buffer (200) stores data during tracing, whether speculative or non-speculative. In one embodiment of the invention, upon satisfying a user's pre-defined condition for transfer, data is transferred from the speculative buffer (202) to the principal buffer (200).

Additionally, in one or more embodiments, the tracing framework (108) may also include a drop counter associated with the principal buffer (200). The drop counter may increment when no space is available for data to be transferred from the speculative buffer (202) to the principal buffer (300). As a result, no data is transferred to the principal buffer.

Additionally, in one or more embodiments, the speculative buffer (202) is a finite resource of the tracing framework. Thus, a system error may occur (i.e., an error counter is incremented) when no speculative buffer (202) is available during an attempt to allocate the speculative buffer (202).

In one or more embodiments, speculative tracing may be described with the following psuedo-code:

Code Sample 2

```
1     probe description 1
      {
2     buffer name = speculation( );
      }
3     probe description 2
4     speculate (buffer name);
      {
5     action;
      }
6     probe description 3
7     /conditional 1/
      {
8     commit (buffer name);
      }
9     probe description 4
10    /conditional 2/
      {
11    discard (buffer name);
      }
```

In the above psuedo-code, speculative tracing is defined by a plurality of probe descriptions, which may include particular functions, i.e., speculation( ), speculate( ), commit( ), and discard( ).

As shown in lines 1 and 2 of Code Sample 2 (i.e., probe description 1), a speculation( ) function is called, which allocates a speculative buffer and returns an identifier for the speculative buffer. The speculate( ) function as shown in probe description 2 at lines 3–5, may be triggered, if and only if, an identifier from the speculation( ) function is passed to the speculate( ) function. Further, the speculate( ) function denotes that the remainder of the clause should be traced to the speculative buffer specified by the speculation( ) function.

In one or more embodiments, speculative tracing may define more than one speculate( ) function. Further, if more than one probe having a speculate( ) function fires, the data (as defined by the function) is traced to a speculative buffer (having the same identifier), which is associated with the processor on which the probe fired (assuming the same identifier is passed to the speculate( ) function).

Lines 6–8 of Code Sample 2 show probe description 3 having the commit( ) function. The commit( ) function commits the speculative buffer associated with the returned identifier to the principal buffer, depending on a conditional statement. In other words, the data sorted in the speculative buffer is transferred to its corresponding principal buffer.

Lines 9–11 of Code Sample 2 show probe description 4 having the discard( ) function. The discard( ) function discards the data in the speculative buffer associated with the returned identifier, depending on a conditional statement. In other words, the data in the speculative buffer is discarded and waits to be "cleaned."

One of ordinary skill in the art will appreciate that the probe descriptions may contain predicates. Additionally, one of ordinary skill in the art will understand that an identifier from a speculation( ) function must be passed to a speculate( ) function and a speculate( ) function may not follow any data recording actions.

Further, one skilled in the art will appreciate that more than one speculation( ) function may be called thereby returning the proper identifiers for the respective speculative buffers. In other words, multiple speculation( ) functions may be called allocating uniquely identified speculative buffers, which may be associated with the same principal buffer.

Figure 3:
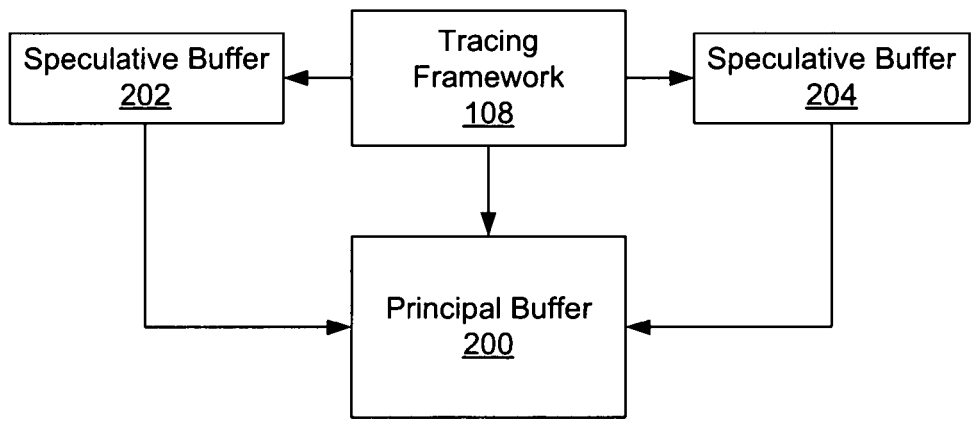
FIG. 3 shows speculative buffers associated with a single principal buffer in accordance with one or more embodiments of the invention.

For example, FIG. 3 shows two speculative buffers assocaited with a single principal buffer in accordance with one or more embodiments of the invention. The tracing framework (108) is connected to a principal buffer (200) and two speculative buffers (202 and 204). The speculative buffers (202 and 204) are each connected to the principal buffer (200), which is associated with a single processor (not shown). Further, the tracing framework (108) includes functionality to transfer data from speculative buffers (202 and 204) to the principal buffer (200) associated with the single processor (not shown). Again, the arrangement of the buffers and the association between the buffers and processors may vary, in accordance with one or more embodiments of the invention.

Additionally, each speculation has a global state, which updates during speculative tracing and governs the execution of the speculative tracing. Table 1 show a chart of global states of a speculation in accordance with one or more embodiments of the invention. In one or more embodiments of the invention, the state names may vary and be grouped in a manner to be represented by a single global state.

TABLE 1

Global State of Speculation

| Global State | Description |
| --- | --- |
| Inactive | Initial state; inactive speculative tracing operation |
| Active | Speculative buffer allocated, however, no tracing has occurred |
| Speculate - One | Speculative tracing operation has occurred on one CPU |
| Speculate - Many | Speculative tracing operation has occurred on multiple CPUs |
| Commit - One | Results of speculative tracing operation being committed to principal buffer associated with one CPU |
| Commit - Many | Results of speculative tracing operation being committed to principal buffer associated with multiple CPUs |
| Discard | Results of speculative tracing operation being discarded |

Figure 4:
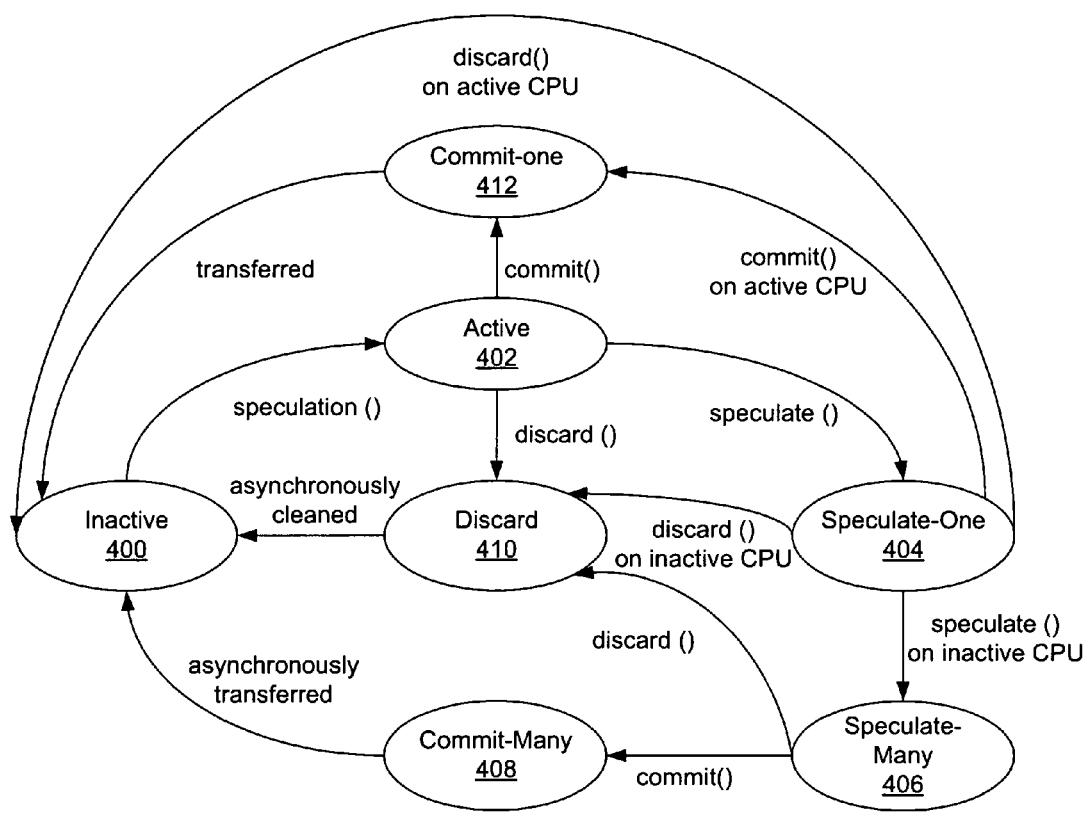
FIG. 4 shows a state transition diagram of a speculative tracing operation for a multi-processor environment in accordance with one or more embodiments of the invention.

FIG. 4 shows a state diagram of global states listed in Table 1, in accordance with one or more embodiments of the invention. FIG. 4 begins in the "inactive" state (400), i.e., no operation or non-speculative tracing is being executed by any processor. Once a probe having a speculation( ) function is triggered, a speculative buffer is allocated, an identifier for the speculative buffer is returned, and the state updates to "active" (402).

From this point, a probe having a commit( ) function or a discard( ) function may be encountered. The state may be updated to "commit-one" state (412) or "discard" state (410), respectively. Based on the state, the data, if any, is committed or discarded, accordingly.

Alternatively, from the "active" state (402), a "speculate-one" state (404) may be reached when a probe having the speculate( ) function is triggered. As previously mentioned, the speculate( ) function results in data being traced and stored in the speculative buffer. Transitioning into the "speculate-one" state records the processor on which the speculate( ) function occurred. From the "speculate-one" state (404), a transition to a "commit-one" state (412) or a "discard" state (410) may occur.

However, if another probe description having a speculate( ) function is encountered, i.e., if another probe speculates to the same buffer on a different processor, then (and only then) is the "speculate-one" state (404) transitioned to the "speculate-many" state (406). Similar to the "speculate-one" state (404), the "speculate-many" state (406) may transition to a "commit-many" state (408) or a "discard" state (410). In the "commit-many" state (408), the data in the speculative buffers is transferred to their respective principal buffers. Alternatively, from the "discard" state (410), the data in the speculative buffers are discarded, and, subsequently, cleaned.

In one or more embodiments, the global states optimize for the case that a speculative buffer is only active on one processor at the time of a commit( ) function or a discard( ) function. In this case, other processors need not take any action, and the speculation( ) function is immediately ready for reuse.

On the other hand, in one or more embodiments, speculative tracing may occur where the speculative buffer is used on more than one processor. In this case, the speculative buffers assocaited with the speculation( ) function must be asynchronously cleaned (which may potentially lead to a higher rate of dirty speculative drops). The rate at which the speculative buffers are cleaned occurs at a user-configurable, fixed interval (i.e., not at probe-triggering time) by making a call to each processor to atomically reset each speculative buffer. Once a speculative buffer has been committed or discarded, the speculative buffer cannot be reused until all of the processors take the same action on their respective speculative buffers. Accordingly, subsequent speculation( ) function calls will be "silently" discarded and commit( ) and discard( ) function calls will fail thereby incrementing a counter, whose contents may be reported back to the user.

In one or more embodiments, the data on the processor calling the commit( ) function is transferred immediately, while the data on other processors are transferred some time after the commit( ) function was called. However, this time is guaranteed to be no longer than the time dictated by the cleaning rate.

In one or more embodiments, the data on the processor calling the discard( ) function is discarded immediately, while the data on the other processors are discarded some time after the discard( ) function was called. However, this time is guaranteed to be no longer than the time dictated by the cleaning rate.

Figure 5:
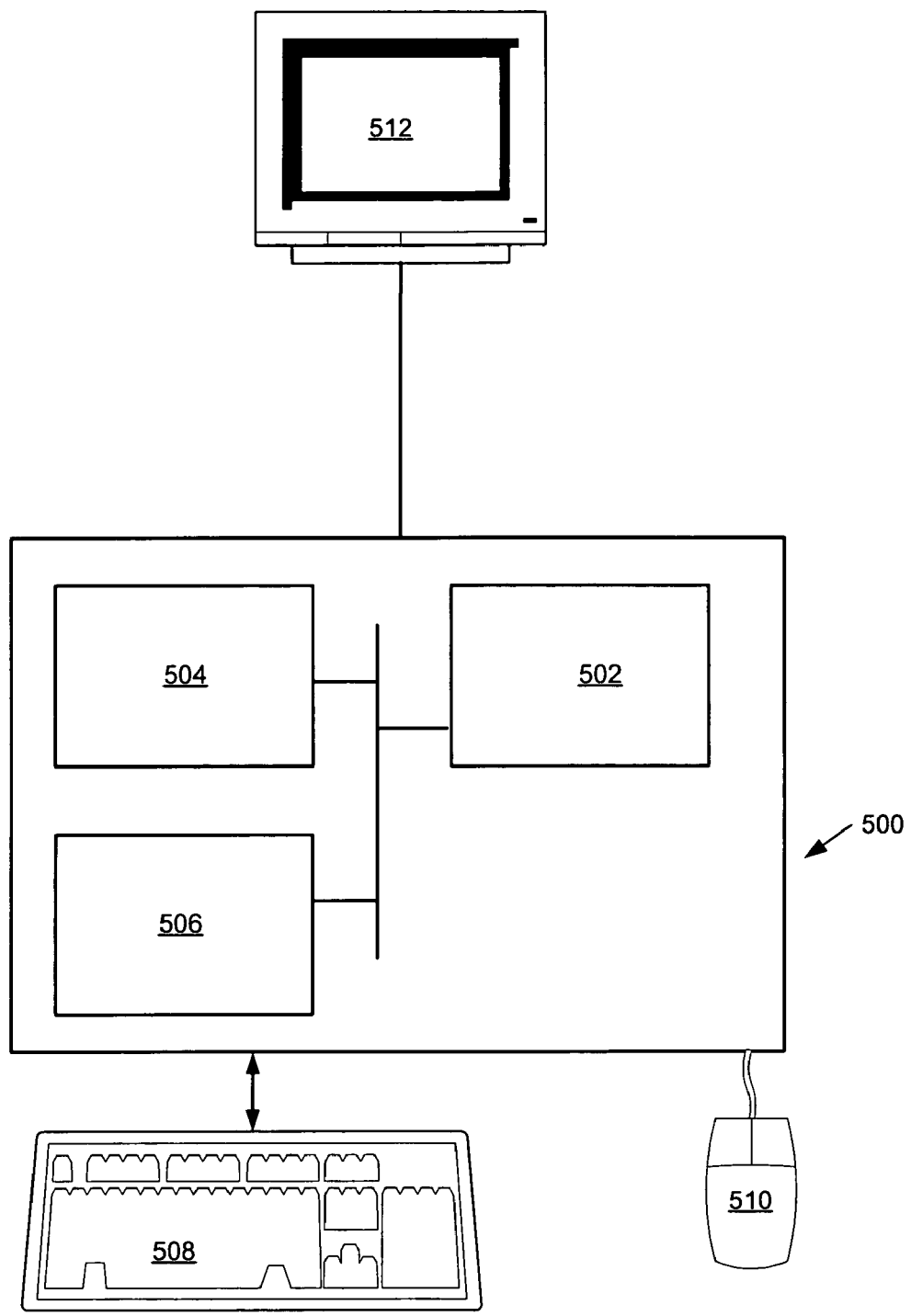
FIG. 5 shows a networked computer system in accordance with one or more embodiments of the invention.

One skilled in the art will appreciate that the invention may be implemented on virtually any type of computer regardless of the platform being used. For example, as shown in FIG. 5, a typical networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network (514) (e.g., the Internet) via a network interface connection (not shown). Those skilled in the art will appreciate that these input and output means may take other forms. Those skilled in the art will appreciate that one or more elements of the aforementioned computer (500) may be located at a remote location and connected to the other elements over a network.

The invention provides a mechanism for a system to be speculatively traced. Speculative tracing also reduces storage of unnecessary data in primary buffers and minimizes analysis time of tracing data. The invention also allows a system to be speculatively traced while reducing lost or dropped data stored in the buffers without unnecessarily locking buffers.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tracing of a program, comprising:
   defining a plurality of probes to trace the program;
   allocating a first speculative buffer using one of the plurality of probes, wherein the first speculative buffer is associated with a first processor;
   encountering one of the plurality of probes during tracing of the program;
   executing an action in the encountered probe to obtain data associated with the program;
   storing the data in the first speculative buffer;
   committing the data to a first principal buffer from the first speculative buffer based on a state value assocaited with the tracing of the program, if one of the plurality of probes comprising a commit function is encountered;
   discarding the data in the first speculative buffer based on the state value, if one of the plurality of probes comprising a discard function is encountered; and
   evaluating the data transferred to the first principal buffer.

2. The method according to claim 1, wherein the state value comprises at least one of a group consisting of a speculate-one state, a speculate-many state, a commit-one state, a commit-many state, and a discard state.

3. The method according to claim 1, further comprising:
   modifying a size of the first speculative buffer.

4. The method according to claim 1, further comprising:
   incrementing a drop counter for a speculative drop of data in the first speculative buffer.

5. The method according to claim 4, wherein the speculative drop corresponds to failing to transfer the data from the first speculative buffer.

6. The method according to claim 4, wherein the speculative drop corresponds to failing to store the data in the first speculative buffer.

7. The method according to claim 1, further comprising:
   executing a cleaning operation for the first speculative buffer if one of the plurality of probes comprising the discard function is encountered.

8. The method according to claim 7, wherein the cleaning operation occurs at a specified cleaning rate.

9. The method according to claim 7, wherein the cleaning operation comprises resetting the first speculative buffer.

10. A system for tracing using a tracing framework, comprising:
    a plurality of probes executing on the tracing framework, wherein each of the plurality of probes is associated with a speculation;
    a first principal buffer configured to store data from the tracing framework and associated with a first processor, wherein data is traced from the first processor using one of the plurality of probes; and
    a first speculative buffer associated with the first principal buffer and configured to transfer data to the $1^{st}$ principal buffer, wherein the first speculative buffer is allocated using one of the plurality of probes, and wherein the data traced from the first processor is stored in the first speculative buffer; and
    wherein the data from the $1^{st}$ speculative buffer is committed to the first principal buffer if one of the plurality of probes comprising a commit function is encountered;
    wherein the data from the $1^{st}$ speculative buffer is discarded if one of the plurality of probes comprising a discard function is encountered; and
    wherein a state value associated with the speculation is updated upon firing at least one of the plurality of probes.

11. The system according to claim 10, wherein the state value comprises at least one of a group consisting of an active state, a speculate-one state, a speculate-many state, a commit-one state, a commit-many state and a discard state.

12. The system according to claim 11, wherein, when the state value is in the active state, the data may be stored in the first speculative buffer.

13. The system according to claim 10, further comprising:
    a second principal buffer configured to store data from the tracing framework and associated with a second processor, wherein a second speculative buffer is associated with the second processor and configured to transfer data to the second principal buffer.

14. The system according to claim 11, wherein, when the state value is the commit-one state, data in the first speculative buffer are transferred to the first principal buffer.

15. The system according to claim 11, wherein, when the state value is the commit-many state, data in the first speculative buffer and data in a second speculative buffer are transferred to the first principal buffer.

16. The system according to claim 11, wherein, when the state value is the discard state, data in the first speculative buffer is discarded.

17. The system according to claim 10, wherein a size of the first speculative buffer is configurable.

18. The system according to claim 10, further comprising:
    a drop counter for incrementing a speculative drop of data in the first speculative buffer.

19. The system according to claim 10, further comprising:
    a second speculative buffer associated with the first principal buffer and configured to store data and transfer data to the first principal buffer, wherein the second speculative buffer is associated with the state value.

20. The system according to claim 19, wherein the first speculative buffer and the second speculative buffer are located in respective cells of an array.

21. A computer system for tracing a program comprising:
    a first processor;
    a memory;
    a storage device; and software instructions stored in the memory for enabling the computer system to:
define a plurality of probes to trace the program;
allocate a first speculative buffer using one of the plurality of probes, wherein the first speculative buffer is associated with a first processor;
encounter one of the plurality of probes during tracing of the program;
execute an action in the encountered probe to obtain data associated with the program;
store the data in the first speculative buffer;
commit the data to a first principal buffer from the first speculative buffer based on a state value associated with the tracing of the program, if one of the plurality of probes comprising a commit function is encountered;
discard the data in the first speculative buffer based on the state value, if one of the plurality of probes comprising a discard function is encountered; and
evaluate the data transferred to the first principal buffer.

* * * * *